E. THOMSON.
COMPENSATOR.
APPLICATION FILED FEB. 10, 1908.

960,440.

Patented June 7, 1910.

Witnesses:

Inventor:
Elihu Thomson,
by Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

COMPENSATOR.

960,440.  Specification of Letters Patent.  Patented June 7, 1910.

Application filed February 10, 1908. Serial No. 415,035.

*To all whom it may concern:*

Be it known that I, ELIHU THOMSON, a citizen of the United States, residing at Swampscott, county of Essex, State of Massachusetts, have invented certain new and useful Improvements in Compensators, of which the following is a specification.

This invention relates to systems of alternating current distribution where transforming or compensating devices are employed to furnish current of modified voltage.

When a reducing transformer or compensator designed to be continually in circuit is used with translating devices taking current for but a small part of the time, as for example incandescent lamps, there will be considerable loss of energy in the iron of the transforming device during the time the current is not required. For example, when a transformer or compensator is used in connection with a group of low voltage tungsten lamps of high economy which are in circuit but a few hours, the current loss during the period of no load may be considerable and may be large enough to negative the high economy of the lamps. In order to reduce the current in the windings of the transformer or compensator during the time of no load, I add to the usual winding of the transformer or compensator a winding having a very much more restricted section than the usual winding and having many turns. This lengthening of the circuit increases the inductive drop in the device, thus reducing the loss of energy under conditions of no load. The extra winding is cut out of circuit when any portion or all of full load of the transformer or compensator is on, as will be hereafter described.

The novel features of my invention are pointed out with particularity in the claims.

The following description when taken in connection with the accompanying drawings, will serve more clearly to set forth my invention.

Figure 1:
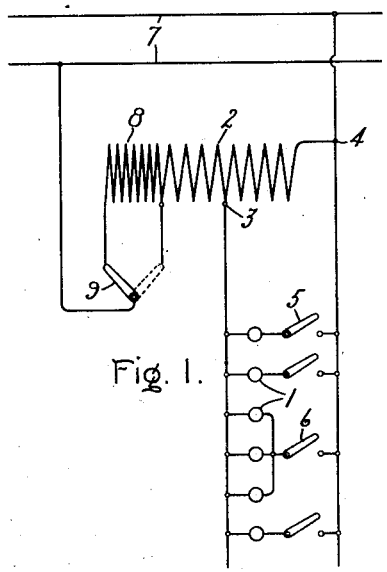
Figure 2:
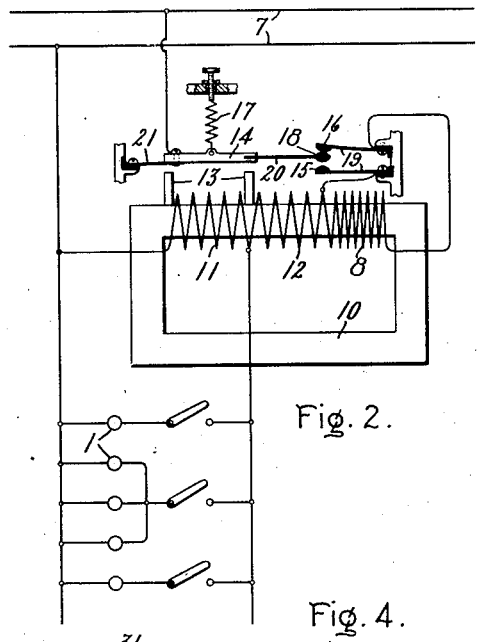
Figure 3:
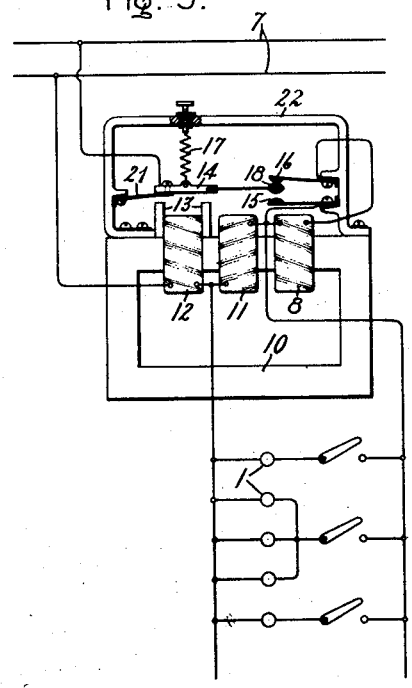
Figure 4:
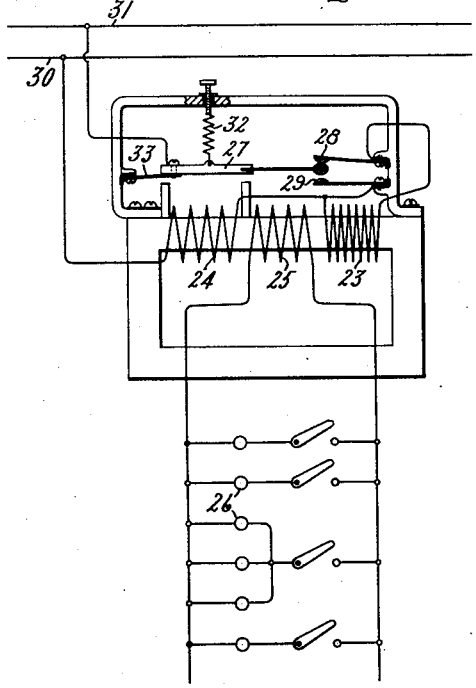

Figure 1 is a diagrammatic representation of a compensator, showing in its simplest form the arrangement of the extra coil with a cut-out switch; Fig. 2 shows an arrangement by means of which the extra coil may be cut out of circuit automatically; Fig. 3 shows how the parts may be compactly combined and shows a possible variation in the positions of the coils; Fig. 4 shows the use of the additonal coil with the primary of a transformer.

In Fig. 1 a group of translating devices 1, as for example, tungsten low voltage lamps, are connected to the compensator 2 in a manner well known in the art, the voltage at terminals 3 and 4 being equal to the inductive drop in the compensator coils between these terminals. These lamps may have the usual socket switches 5, or a group switch 6. The compensator is connected by the supply conductors 7 to a suitable source of alternating current. The additional fine wire winding 8 is connected in series with the compensator. A suitable switch 9, serves to cut the coil 8 out of circuit when one or all of the lamps are taking current, the switch then being in the position as shown by dotted lines. When the lamps are again cut out of circuit, the switch 9 is returned to its original position, throwing the coil 8 again into circuit with the compensator. This operation may be made automatic as will be shown.

In Fig. 2 the arrangement of translating devices 1, compensator 2 and supply circuit 7 is similar to that shown in Fig. 1, but an automatic arrangement for actuating the switch for cutting out coil 8 is here shown. The compensator is represented with an iron core 10. The windings are divided into three sections, the fine wire coil 8 and sections 11 and 12, the load 1 being placed in shunt with section 11. A projecting thin mass of iron 13 is shown on each side of the coil 11. The cross-section of these projecting parts is such that they are practically saturated with magnetic flux whenever a portion of the load 1 is thrown on and the current flows through coil 11. Making these projecting parts 13 of this restricted cross-section prevents too much magnetism from being shunted around coil 11, thus avoiding too great an inductive drop in coil 11. When any part of the load is thrown into circuit, causing current to flow through coil 11, the projecting magnetic poles act upon the armature 14 drawing the same down and closing the contact 15, and simultaneously opening contact 16. This act throws the coil 8 out of circuit and makes contact between the end of coil 12 and the supply main. The armature 14 is attached to a long flexible spring 17 which serves to return it to its original position, opening contact 15 and closing 16 when it is released by the poles 13. The armature is made somewhat massive, and being connected with the long flexible spring has a vibration period less than the cyclic vibration produced by the alternating current. The contact 15 will, therefore, remain closed as long as current is flowing in the coil 11, especially if the contacts 15 and 16 and the armature contact 18 are supported on flexible laminæ or springs 19 and 20. The armature itself is attached to a flexible plate 21. The limits of motion may be adjustable, as also the tension of the spring 17.

When the compensator is used with tungsten or tantalum lamps their relatively low cold resistance, as compared with their hot resistance, will cause a rush of current to traverse the coil 11 at the instant one or more is thrown into circuit, this initial current acts as a positive factor in closing the switch. When the load is thrown off, the armature is at once released and being returned to its original position by means of spring 17, the fine section 8 again comes into play to assist in saving energy.

Of course it is not necessary to place the coils on the core in exactly the order given. Fig. 3 shows a variation in this respect. The load section 11 occupies a position between coils 12 and 8, the latter as in Fig. 2 being the finer winding. The figure also serves to show a little less diagrammatically how the parts may be combined as a single device. The frame 22, supported by the iron core 10 of the transformer serves to hold in position in a compact form the various parts of the automatic switch. Contacts 15 and 16 are insulated from the frame by bushings. Likewise the spring support 21 and the controlling spring 17 of the armature 14 are insulated by bushings.

In Fig. 2 and Fig. 3, similar reference numerals indicate similar parts.

In Fig. 4 the fine wire coil 23 is shown as forming part of the primary 24 of a transformer. The secondary is shown as a separate coil 25 feeding the load 26. This great lengthening of the primary circuit under conditions of no load greatly increases the inductive drop and hence diminishes considerably the leakage current. When the lamps or other translating devices 26 are thrown into circuit the initial rush of load current in the secondary will cause a corresponding rush in the primary and will trip the armature 27, breaking the contact 28 and making the contact 29. This will cut the fine wire coil 23 out of circuit. The current will then pass from the supply-wire 30 to primary coil 24, to the contact 29, from thence to the armature 27, and supply wire 31. The same considerations as regards weight of the armature and length of the springs 32 and 33 need to be taken into account here as in the construction of the similar parts in the compensator, as described above, so as to make the vibration period of the spring less than the cyclic vibration of the alternating current. When this is done the contact 29 will remain closed so long as a load current is flowing in the secondary, but it will open at once when the load is thrown off.

What I claim as new and desire to secure by Letters Patent of the United States, is,—

1. The combination of a current transforming device, a coil of high inductance in series with this device, a source of alternating current, and means for automatically severing the connection of the auxiliary coil with the said source of current and substituting therefor a connection to the aforesaid transforming device.

2. In a system of alternating current distribution, the combination of a current transforming device, a source of alternating current, means for greatly increasing the inductive resistance of said transforming device at no load, and means actuated by leakage flux from said device for automatically reducing the inductive resistance of said device at the instant a part or full load current is taken from said device.

3. The combination of a current transforming device, an auxiliary coil of high inductance in series with the same, a source of alternating current, iron pole pieces magnetically excited by said current, a spring controlled armature actuated by the attractive force of said pole pieces and contacts connected with said armature to enable the auxiliary coil to be cut out of circuit by a movement of the armature.

4. In systems of alternating current distribution by transformers, an auxiliary coil of high inductance in series with the primary circuit of said transformer, a source of alternating current, iron pole pieces magnetically excited by a current in the primary circuit of said transformer, a spring controlled armature magnetically actuated by said pole pieces, and contacts spring connected to said armature to cut said auxiliary coil out of circuit.

5. The combination of a current-transforming device, a coil of high impedance mounted on the core of said device and in series with a winding thereof, at no load, and automatic means for disconnecting the high inductance coil from the circuit when the load comes on.

6. The combination of a current-transforming device, a coil of high inductance in series with a winding thereof, means for diverting part of the magnetic flux from the core of the transforming device, and switching means actuated by said flux for removing the high inductance coil from the circuit when the load comes on.

7. The combination with a current-transforming device with a load of incandescent lamps having positive temperature-resistance co-efficient, of a coil of high inductance in series with the transforming device, and switching means for removing the coil of high inductance out of circuit, said means being actuated by the flux set up in the transforming device when the load is thrown in circuit.

8. The combination of a transformer coil, a separate coil of high inductance in series with the same, means for diverting part of the magnetic flux from the transformer core, an armature actuated by said diverted flux, and contacts coöperating with said armature for cutting the high inductance coil out of circuit when a current is taken from the transformer coil.

9. The combination of a current-transforming device having a coil energized from an alternating current source, a coil of high inductance in series with the same, pole pieces magnetized by current in said transforming device, an armature having a vibration period less than the cyclic vibration produced by the alternating-current, and flexibly supported contacts coöperating with said armature, for removing the coil of high inductance out of circuit and for restoring the connection of the said transformer coil with the source of alternating current when a load current is taken from the transforming device.

10. The combination of a current-transforming device, a coil of high inductance mounted on the core thereof and in series with a winding of the same, and switching means for cutting the high inductance device out of circuit when current is taken from the transforming device, said switching means being actuated by the magnetic flux set up in said core.

In witness whereof, I have hereunto set my hand this fifth day of February, 1908.

ELIHU THOMSON.

Witnesses:
   JOHN A. MCMANUS, Jr.,
   HENRY O. WESTENDARP.